Dec. 16, 1947.   M. L. FORREST   2,432,567
QUICK-DETACHABLE HEAD, GUARD, AND HELPER'S HANDLE FOR CHAIN SAWS
Filed Oct. 9, 1944   2 Sheets-Sheet 1

INVENTOR
MARK L. FORREST
BY Chapin & Neal
ATTORNEYS

Dec. 16, 1947.  M. L. FORREST  2,432,567
QUICK-DETACHABLE HEAD, GUARD, AND HELPER'S HANDLE FOR CHAIN SAWS
Filed Oct. 9, 1944   2 Sheets-Sheet 2

INVENTOR
MARK L. FORREST
BY Chapin & Neal
ATTORNEYS

Patented Dec. 16, 1947

2,432,567

UNITED STATES PATENT OFFICE 2,432,567

QUICK-DETACHABLE HEAD, GUARD, AND HELPER'S HANDLE FOR CHAIN SAWS

Mark L. Forrest, Leavenworth, Wash.

Application October 9, 1944, Serial No. 557,738

3 Claims. (Cl. 143—32)

1

This invention has to do with a power driven chain saw and relates more particularly to a combined helper's handle and housing guard for the free end of such a saw and in the idler pulley assembly for the cutting chain carried within said housing guard. An object of the invention is to provide a helper's handle and housing guard which may be quickly detached from the end of the saw without the use of tools.

A further object is the provision of improved means housed within the guard for rotatably carrying the free end of the cutting chain and comprising a ball bearing having a free floating rotatable outer bearing ring serving as the idler pulley for the chain and an inner bearing ring designed with appropriate oil passages to facilitate the lubrication of both bearing and chain. A cut out opening in the guard wall gives access to an inlet oil hole leading to said passages whereby the pipe line from a gun type oil lubricator may be readily applied thereto.

Power driven chain saws when used for felling trees and bucking logs, timbers and the like are customarily provided with helper's handle at the free end of the saw opposite the power driven end, whereby two men may handle the saw, one at the power driven end and one at the free end. When sawing through a heavy log, and more particularly when buck sawing the same on the ground, it becomes necessary to wedge open the kerf behind the saw as it progresses through the log in order to prevent squeezing or cramping of the saw in its sawing progress. This wedging of the saw kerf behind the saw usually requires the saw to be drawn out endwise from the kerf when the work is finished and this in turn necessitates the removal of the helper's handle from the free end of the saw in order to make such endwise withdrawal thereof. In the usual construction of helper's handle and guard now commonly employed with these saws, the removal of the handle and guard requires the stopping of the sawing operation as well as the use of special tools for dismantling the same. Much valuable time is lost in such a disassembly whereas with my improvement the handle and guard are made quickly detachable in the field without tools and with no time lost in the sawing operation.

Further advantages and improvements will become more apparent in the following more detailed description taken in connection with the accompanying drawings in which.

Figure 1:
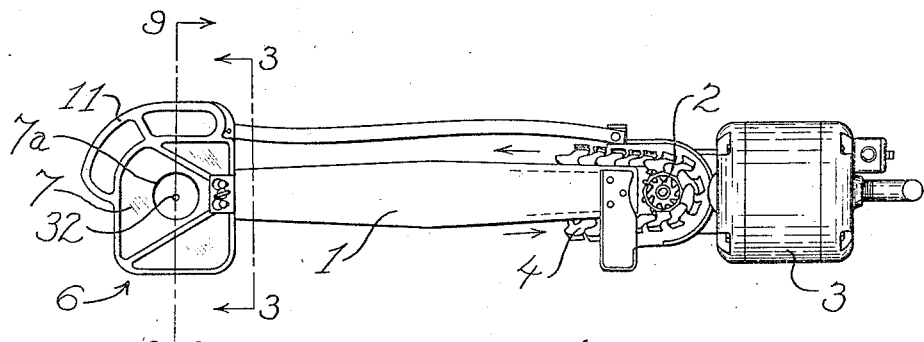
Fig. 1 is a side elevation of a complete power chain saw.
Figure 3:
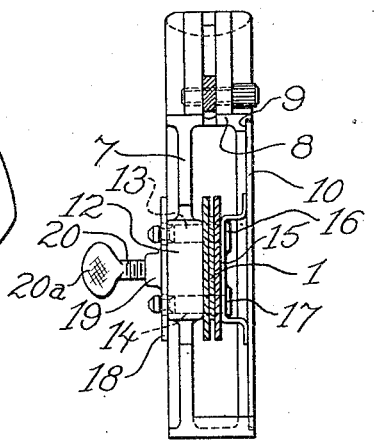
Figure 4:
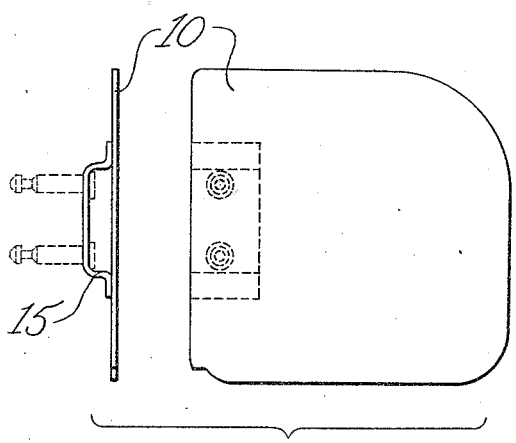
Figure 5:
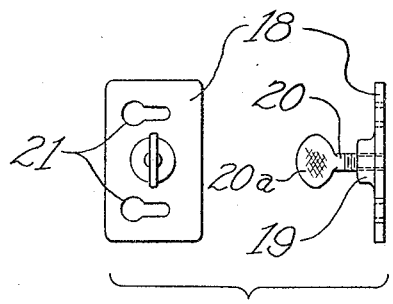
Figure 7:
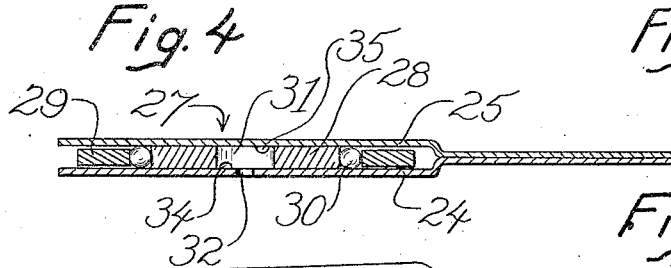
Figure 6:
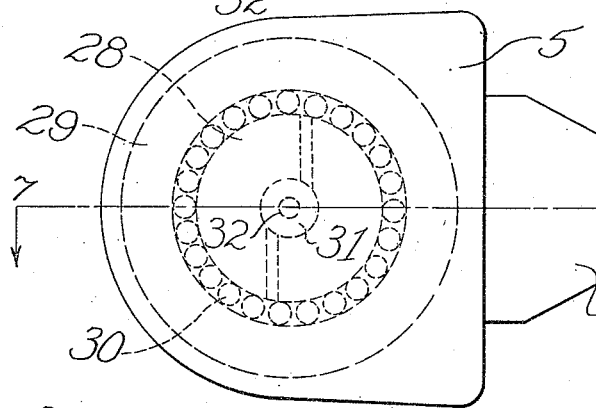
Figure 8:
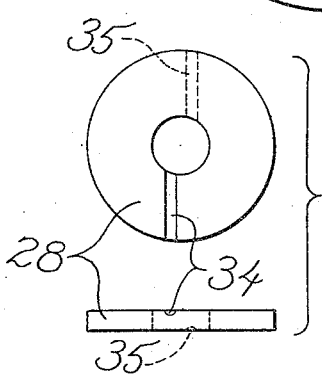
Figure 9:
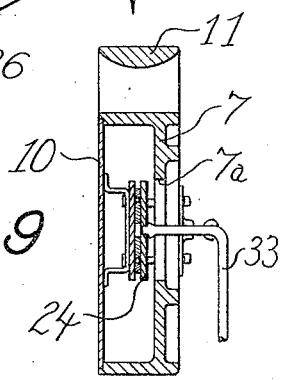

2 scale at the free end of the saw with the cover plate of the housing guard removed therefrom;

Fig. 3 is an end view of the assembled parts looking in the direction of the arrows from the section line 3—3 in Fig. 1;

Fig. 4 is a group view showing in front and end elevation the cover plate;

Fig. 5 is a group view showing in front and end elevation the clamp piece;

Fig. 6 is a side view of the idler pulley mount;

Fig. 7 is a section of the same along line 7—7 of Fig. 6;

Fig. 8 is a group view showing the inner ball race ring detached as seen from one side and at its edge; and Fig. 9 is a detail section along line 9—9 of Fig. 1 to show how the oil line is applied for lubrication (on an enlarged scale).

Referring more particularly to the drawings the power driven saw comprises the usual cutter bar 1 having mounted at the power end a driving sprocket 2 and motor 3 for driving the same. The usual cutting chain indicated at 4 extends around driving sprocket 2 at the inner end of said cutter bar and around an idler pulley of an assembly 5 at the outer end of said cutter bar, said idler pulley being shown dotted in Fig. 2.

Figure 2:
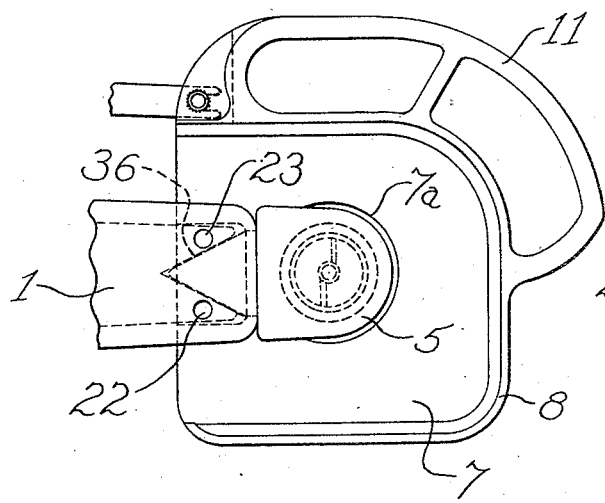
Fig. 2 is a detailed view on slightly larger

The helper's handle of my improvement is combined with a housing guard to inclose the idler pulley and the portion of cutting chain carried thereon at the free end of the cutter bar. This housing guard indicated generally at 6 comprises as shown in Figs. 2, 4, and 5 three separate detachable members. One of the members as indicated at 7 in Figs. 2 and 3 is formed as a flanged housing plate with a recessed chamber to receive the end of the saw. The flange portion 8 of said plate is rabbeted at its upper edge 9 to receive in fitting relation a cover plate 10 which when in place incloses the idler pulley and its cutting chain within the housing plate. Gripping handles 11 are formed preferably as an integral part of the top and rear flange portions 8 of the housing plate 7 as shown. At the front central part of the housing plate is fastened or welded a spacing block 12 adapted to abut against one side of the cutter bar 1 and space the housing plate therefrom. Perforations 13 and 14 are formed in said spacing block to receive locking pins for the assembly as later described. As shown in Fig. 1 a portion of plate 7 is cut away at 7a to give access to the oil hole 32 in the idler pulley assembly hereinafter described.

The cover plate 10 has at its front central part an inwardly offset portion 15 carrying two locking pins 16 and 17 which are adapted to extend through perforations of the housing plate and of the cutter bar to fasten the same together. The pins 16 and 17 are firmly fastened or welded to the offset portion 15 and the outer ends of said pins are formed with reduced necks as shown. The offset portion 15 abuts against the cutter bar 1 at the position opposite the spacing block 12 of plate 7.

As shown in Fig. 5 the clamping piece 18 is a small rectangular flat plate with a centrally located screw threaded boss 19 to receive a screw stud 20. The screw stud 20 is permanently carried in its clamping piece 18 and is formed with a finger portion 20a for turning the same. The clamping piece 18 is also formed with a pair of keyhole slots 21 to engage and lock with the reduced necks of pins 16 and 17.

In assembling the handle housing guard upon the end of the saw, the plates 7 and 10 are clamped upon the interposed cutter bar 1 with the locking pins 16 and 17 extended through the perforations 13 and 14 of the plate 7 and perforations 22 and 23 provided in the cutter bar 1 for alignment therewith. The clamping piece 18 is then fitted over the ends of the pins which protrude through the housing plate 7 and the keyhole slots 21 are locked with the ends of said pins 16 and 17. Thereupon the stud screw 20 is screwed inwardly which exerts a thrust against the plate 7 and serves to draw said plates 7 and 10 together with a clamping action upon the interposed cutter bar. It will be noted that this assembly operation, as well as the disassembly operation may be performed while the saw is operating. The plates 7 and 10 are sufficiently spaced from the running cutting chain so that this operation may be accomplished without danger. All of the parts are held together by the single stud screw 20 which may be loosened or tightened by the fingers alone.

The idler pulley assembly 5 comprises two retainer plates 24 and 25 which are joined or welded together at their inner portions to form a wedge shaped tongue part 26 and are offset for being spaced apart in parallel relation at their outer portions to form a fork part 27. A spacing disk is riveted between the said plates 24 and 25 in the fork part thereof to serve as an inner race ring 28 for balls 30 of a ball bearing. An outer race ring 29 is mounted through the interposed balls 30 upon the inner race ring for a free floating rotation thereon, said outer race ring serving as the idler pulley for carrying the cutter chain. The spaced apart sides of the plates 24 and 26 extend outwardly beyond the ring 29 to guide the cutting chain thereon. The inner race ring is formed with a large central opening or cored out recess for receiving oil indicated at 31 in Figs. 6 and 8 and a small oil hole 32 through one of the retainer plates 24 is in communication therewith. The oil hole 32 is adapted to have applied thereto an oil pipe line 33 from a suitable lubricator (not shown) of the oil gun type. Oil grooves 34 and 35 are formed on the side of said inner race ring as shown in Figs. 6 and 8 whereby the oil introduced into the center of said ring may run to the periphery thereof and reach both the bearing of said idler pulley as well as the cutting chain carried thereon. As shown in Fig. 7 the outer ring 29 is of such thickness as to be slightly spaced from the sides of the retainer plates 24 and 25 so that oil may freely pass to the chain on the outer periphery of said ring 29. During operation of the saw the lubricator will continuously or intermittently supply oil to the center opening 31 which will flow outwardly through the ball bearing and cleanse it from sawdust to keep the bearing rolling freely. As shown in Fig. 9 the oil pipe line 33 from the lubricator may be held in position against the oil hole 32 in any suitable manner.

For the mounting of the idler pulley on the saw, the outer end of the cutter bar is formed with a wedge shaped socket 36 as indicated at dotted lines in Fig. 2 which is adapted to receive the tongue part 26 of the pulley retainer plates. No further fastening means are required since the cutting chain passing around its pulley in the working of the saw will serve to hold said parts in place. It will be noted that the free floating action of the outer pulley ring on its bearing will allow the cutting chain to run its natural course with sufficient freedom of action to avoid binding or friction.

I claim:

1. In a power chain saw having its cutter bar and cutting chain, an idler pulley supported on said cutter bar for carrying said cutter chain at the free end of said saw, a quick detachable guard for the idler pulley and cutter chain, said guard comprising an assembly of three separate detachable members one member being formed as a flanged housing plate having a recessed chamber to receive the end of said saw, the second member being formed as a substantially flat cover plate to fit over the recessed chamber of said first member and carrying locking pins which extend through aligned perforations in said cutter bar and first member, and the third member constituting a clamp piece with slotted portions to engage the ends of said pins which protrude through said first member and carrying a stud screw to exert a thrusting action against said first member for clamping said first and second members together upon said interposed cutter bar.

2. In a power chain saw having its cutter bar and cutting chain, an idler pulley supported on said cutter bar for carrying said cutter chain at the free end of said saw, a quick detachable guard for the idler pulley and cutter chain, said guard comprising an assembly of three separate detachable members, one member being formed as a flanged housing plate having a recessed chamber to receive the end of said saw, a pair of handle grips extending from the top and rear flange edges of said housing plate, the second member being formed as a substantially flat cover plate to fit over the recessed chamber of said first member and carrying locking pins which extend through aligned perforations in said cutter bar and first member and the third member constituting a clamp piece with slotted portions to engage the ends of said pins which protrude through said first member and carrying a stud screw to exert a thrusting action against said first member for clamping said first and second members together upon said interposed cutter bar.

3. In a power chain saw having its cutter bar and cutting chain, an idler pulley supported on said cutter bar for carrying said cutter chain at the free end of said saw, a quick detachable guard for the idler pulley and cutter chain, said guard comprising an assembly of three separate detachable members, one member being formed as a flanged housing plate having a recessed chamber to receive the end of said saw, a spacer block fastened on said plate at the forward part of said recessed chamber to abut against one side of said cutter bar, the second member being formed as a substantially flat cover plate to fit over the recessed chamber of said first member and carrying locking pins which extend through aligned perforations in said cutter bar and first member, said second member having an inwardly offset portion at its forward edge to abut said cutter bar at the opposite side from said spacer block, and the third member constituting a clamp piece with slotted portions to engage the ends of said pins which protrude through said first member and carrying a stud screw to exert a thrusting action against said first member for clamping said first and second members together upon said interposed cutter bar.

MARK L. FORREST.

REFERENCES CITED

The following references are of record in the file of this patent:

UNITED STATES PATENTS

| Number | Name | Date |
|---|---|---|
| 807,731 | Dodge | Dec. 19, 1905 |
| 1,717,547 | Bens | June 18, 1929 |
| 1,903,571 | Meyer | Apr. 11, 1933 |
| 1,016,664 | Bailey | Feb. 6, 1912 |
| 1,642,856 | Holmes | Sept. 20, 1927 |
| 1,786,641 | Berg | Dec. 30, 1930 |
| 2,316,997 | Smith | Apr. 20, 1943 |
| 2,326,854 | Hassler | Aug. 17, 1943 |

FOREIGN PATENTS

| Number | Country | Date |
|---|---|---|
| 402,765 | Great Britain | Nov. 28, 1933 |
| 539,956 | Great Britain | Sept. 30, 1941 |